J. HERBY.
FIFTH WHEEL.
APPLICATION FILED DEC. 4, 1908.
939,254.
Patented Nov. 9, 1909.
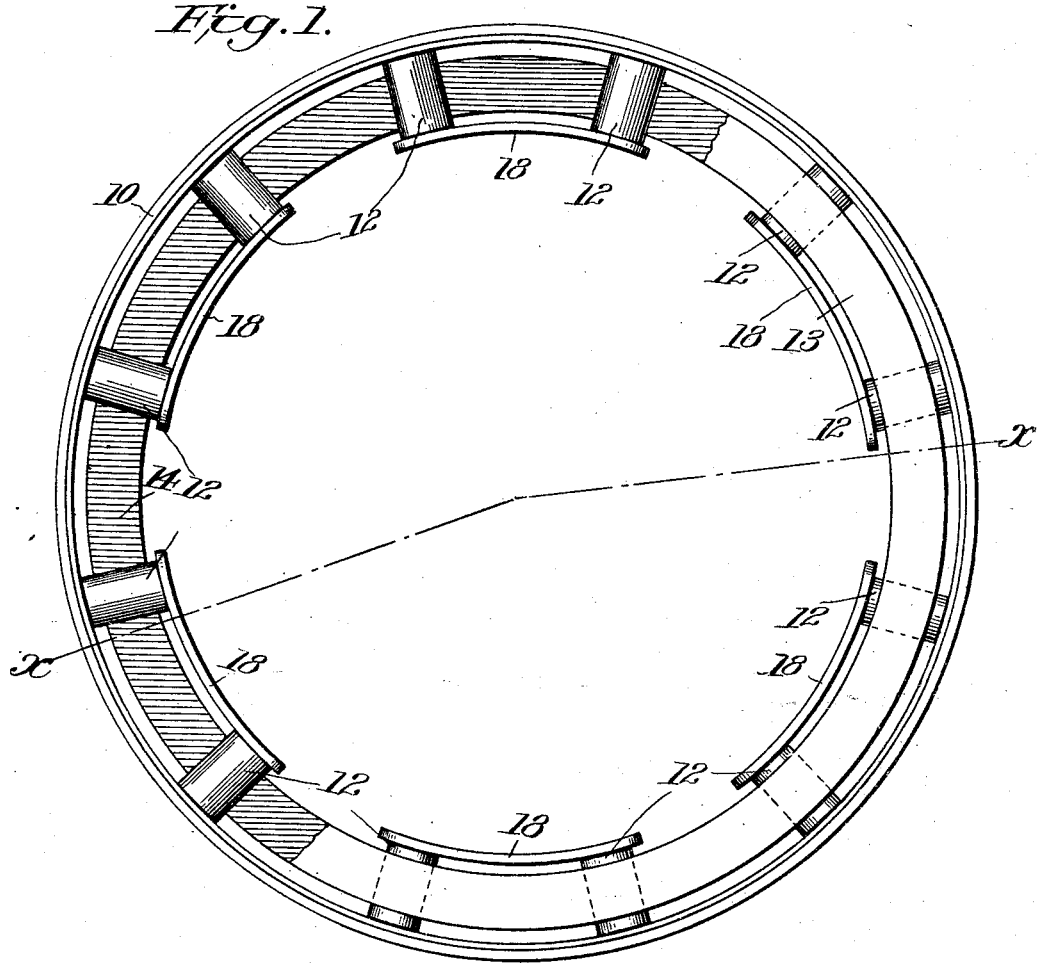
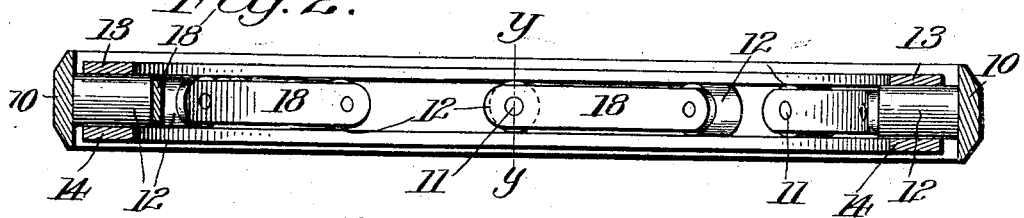
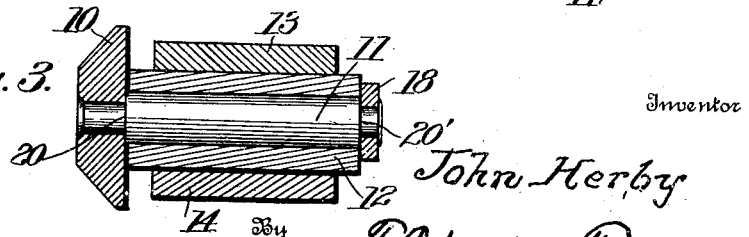
Witnesses
C. H. Walker
A. C. E. Heap
Inventor
John Herby
By T. Walter Fowler
Attorney

UNITED STATES PATENT OFFICE.

JOHN HERBY, OF JAMESTOWN, NEW YORK.

FIFTH-WHEEL.

939,254.  Specification of Letters Patent.  Patented Nov. 9, 1909.

Application filed December 4, 1908. Serial No. 465,976.

*To all whom it may concern:*

Be it known that I, JOHN HERBY, a citizen of the United States, residing at Jamestown, in the county of Chautauqua and State of New York, have invented certain new and useful Improvements in Fifth-Wheels, of which the following is a specification.

My invention relates to certain new and useful improvements in vehicle gears and particularly to what is known as the "fifth-wheel" for vehicles, and my invention consists of the parts and constructions and combinations of parts which I will hereinafter describe and claim.

An essential object of my invention is to provide a fifth-wheel or wagon-gear with an outside band or circle only and a roller-bearing in connection therewith which will form a bearing upon which suitable ring-tracks will accurately run, even though the gear be bent out of shape, said roller-bearing being so constructed that a relative sliding movement is provided between the rollers and the ring-tracks which are supported thereon, to compensate for irregularities in the shape of said ring-tracks.

A further object of my invention is to provide a fifth-wheel for vehicles in which lightness and durability will be combined with cleanliness of construction and wherein friction will be reduced to a minimum and where a substantially accurate roller-bearing will be provided for the ring-tracks of the fifth-wheel.

In the accompanying drawing forming part of this specification and in which similar reference characters indicate like parts in the several views:—Figure 1 is a plan view of my improved fifth-wheel showing a portion of the upper ring-track broken away. Fig. 2 is a cross-sectional view of the same on the line X—X of Fig. 1. Fig. 3 is an enlarged sectional view on the line Y—Y of Fig. 2.

In carrying out my invention, I provide a single outside band or narrow circular strip 10, of metal pierced at suitable points to receive the radially-disposed pins or spindles 11, said pins or spindles extending inwardly toward the center of the circular strip for a suitable distance and having their outer ends upset or riveted or otherwise fixedly secured to said strip.

Rotatably mounted upon the pins or spindles are the long rollers 13, which form a roller bearing for the two ring-tracks 13 and 14, one of these tracks resting upon the upper surfaces of the rollers while the other track is designed to be maintained in sliding contact with the bottom surfaces of said rollers.

As shown in Fig. 3, the pins or spindles have reduced outer ends fitting openings in the outside band and to which openings these ends are riveted, the reduced portion of each of the pins or spindles forming a shoulder 20, at its junction with the main part of the spindle and which shoulder abuts squarely against the inner surface of the outside ring or circular strip.

It will be observed in Fig. 1, that I connect the inner ends of the pins or spindles in pairs, that is the inner ends of adjacent spindles are connected, but it is obvious that any desired number of these pins or spindles may have their inner ends connected in groups, therefore I do not limit myself to the connecting together of adjacent pins or spindles only as the joinder of any number of pins or spindles in a group is within the scope of my invention. However, I desire to state that no inside circle or band is used, but that the means for supporting or connecting the inner ends of the spindles in groups consists of substantially short curved or segmental plates 18, which are so constructed as to permit the ring tracks to slide partially over their edges in case said tracks are irregular circles.

As before stated I use an outside band only and arrange the rollers in groups upon pins or spindles whose inner ends are rigidly fixed to substantially short segmental or curved plates, said plates in the aggregate taking the place of an inside circle or circular strip corresponding to the outside circle or strip and being so constructed that the ring tracks when placed in engagement with the upper and lower surfaces of the rollers will each have a sliding movement on said rollers to compensate for irregularities in the track rings and to permit of the successful use of track rings which do not represent true circles. I also prefer to form the pins or spindles with reduced portions at their inner ends so as to form shoulders 20', which abut against the inner side of the segmental plates, said reduced inner ends passing through holes made in said plates and said ends being upset or riveted to secure the plates upon the pins. In order that the ring tracks if somewhat irregular and not being true circles may have a free radial sliding movement upon the rollers, I prefer to make the curved or segmental plates slightly narrower than the diameter of the rollers, consequently the upper and lower track rings are thus permitted to slide over the top and bottom edges of the curved or segmental plates at the inner ends of the rollers to thereby provide for any irregularity in the ring tracks.

By reason of the foregoing construction, I am permitted to make a fifth wheel for a vehicle with an outside band or circular strip only, in connection with rollers connected together in groups by means of independent curved or segmental plates, and wherein these short inside plates permit the ring tracks to slide partially over them in case there are irregular curves in said tracks and which irregularities could not be compensated for when using an inside band similar to the outside band, unless the roller bearing was made so wide that it would be practically useless for the ordinary vehicle.

Having thus described my invention what I claim as new and desire to secure by Letters Patent is:—

1. In a fifth-wheel, the combination of an outside circular band or strip, a series of pins or spindles fixed thereto and projecting radially from the inner side thereof, supporting means for the inner ends of said pins, rollers loosely mounted on the pins, and ring-tracks with which the rollers engage, said rollers having a diameter in excess of the width of said inner supporting means whereby the ring-tracks may be moved radially over the rollers and past the vertical plane of said supporting means in response to irregularities in the ring tracks.

2. In a fifth wheel, the combination of an outside band or circular strip, a series of pins or spindles fixed thereto and projecting radially from the inner side thereof, independent segmental plates on the inner ends of the pins or spindles and each connecting the pins or spindles in groups, and rollers loosely mounted on the pins or spindles said rollers having a greater diameter than the width of the segmental plates, whereby the ring tracks move radially over the rollers and edges of the plates in response to irregularities in the ring tracks.

3. In a fifth wheel, the combination of an outside band or circular strip, pins or spindles fixed thereto and projecting radially from the inner side thereof, said pins or spindles having their outer ends reduced to form shoulders which abut against the inner surface of the outside band and said reduced portions of the pins being passed through said band and fixed thereto, rollers loosely mounted on the pins, ring-tracks rotatably mounted on said rollers, and independent segmental plates connecting the inner ends of the pins or spindles in groups, said pins or spindles having their inner ends reduced to pass through the plates and to be fixed therein and to form shoulders which abut against the inner side of said plates, and said plates having a width less than the diameter of the rollers to permit the ring tracks to slide radially to compensate for irregularities therein.

4. An improved fifth-wheel comprising an annular series of rollers, means for supporting the inner and outer ends of said rollers, and hubless, substantially narrow, annular track-rings adapted to operate over the rollers, said inner roller supporting means having a width less than the diameter of the rollers whereby the ring-tracks may move over the edges of said inner supporting-means to compensate for irregularities in said ring-tracks.

In testimony whereof I affix my signature in presence of two witnesses.

JOHN HERBY.

Witnesses:
  JOHN G. O'BRIEN,
  W. H. TYLER.